(12) United States Patent
Sheller et al.

(10) Patent No.: US 10,511,600 B2
(45) Date of Patent: *Dec. 17, 2019

(54) MAINTAINING USER AUTHENTICATIONS WITH COMMON TRUSTED DEVICES

(71) Applicant: INTEL CORPORATION, Santa Clara, CA (US)

(72) Inventors: Micah J. Sheller, Hillsboro, OR (US); Yonghong Huang, Portland, OR (US); Narjala P. Bhasker, Portland, OR (US); Jason Martin, Beaverton, OR (US); Cory Cornelius, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,063

(22) Filed: Jan. 8, 2018

(65) Prior Publication Data

US 2018/0359247 A1  Dec. 13, 2018

Related U.S. Application Data

(63) Continuation of application No. 14/757,769, filed on Dec. 23, 2015, now Pat. No. 9,866,555.

(60) Provisional application No. 62/219,922, filed on Sep. 17, 2015.

(51) Int. Cl.
*H04L 29/06* (2006.01)
*G06F 21/20* (2006.01)
*H04W 12/00* (2009.01)
*H04W 12/06* (2009.01)
*H04W 12/08* (2009.01)
*G06F 1/16* (2006.01)
(Continued)

(52) U.S. Cl.
CPC .......... *H04L 63/0876* (2013.01); *G06F 21/30* (2013.01); *G06F 21/305* (2013.01); *H04L 63/0853* (2013.01); *G06F 1/163* (2013.01); *G06F 3/01* (2013.01); *G06F 3/014* (2013.01); *G06F 3/017* (2013.01); *H04L 63/0492* (2013.01); *H04W 12/00503* (2019.01); *H04W 12/06* (2013.01); *H04W 12/08* (2013.01)

(58) Field of Classification Search
CPC . G06F 1/163; G06F 3/01; G06F 3/014; G06F 3/017; G06F 21/30; G06F 21/305; G06F 1/16; H04W 12/08; H04W 12/00; H04W 12/06; H04L 29/06
See application file for complete search history.

(56) References Cited

U.S. PATENT DOCUMENTS

2010/0299530 A1* 11/2010 Bell .................... G06F 21/32
                                                      713/186
2012/0174043 A1*  7/2012 Queru ................... B60K 37/06
                                                      715/863

(Continued)

*Primary Examiner* — Jayesh M Jhaveri

(57) ABSTRACT

Various embodiments are generally directed to an apparatus, method, and other techniques to maintain user authentications with common trusted devices. If a user is in possession of a first computing device (e.g., a smartphone), an unlocked state of the first trusted device is maintained if the user is using a nearby trusted device (e.g., a computer) within a certain amount of time. If the first trusted device is in a pocket or other container, a longer span of time is granted to the user to register an on-body state.

25 Claims, 9 Drawing Sheets

(51) Int. Cl.
*G06F 3/01* (2006.01)
*G06F 21/30* (2013.01)

(56) References Cited

U.S. PATENT DOCUMENTS

| | | | | |
|---|---|---|---|---|
| 2012/0235790 | A1* | 9/2012 | Zhao | G06F 21/32 340/5.83 |
| 2014/0139422 | A1* | 5/2014 | Misty | G06F 3/014 345/156 |
| 2014/0139454 | A1* | 5/2014 | Mistry | G06F 3/041 345/173 |
| 2014/0139637 | A1* | 5/2014 | Mistry | H04N 5/2252 348/46 |
| 2015/0074615 | A1* | 3/2015 | Han | G06K 9/00033 715/863 |
| 2015/0161374 | A1* | 6/2015 | Kim | G06F 1/1694 726/19 |
| 2016/0103985 | A1* | 4/2016 | Shim | G06F 3/0346 726/19 |
| 2018/0025351 | A1* | 1/2018 | Chen | G06Q 20/204 705/67 |

* cited by examiner

100

MAINTAINING USER AUTHENTICATIONS WITH COMMON TRUSTED DEVICES

CROSS-REFERENCE TO RELATED APPLICATIONS

This application is a continuation of, claims the benefit of, and claims priority to U.S. patent application Ser. No. 14/757,769 filed on Dec. 23, 2015, which is a non-provisional of U.S. Provisional Patent Application Ser. No. 62/219,922, filed on Sep. 17, 2015, both of which are hereby incorporated herein by reference in their entirety.

BACKGROUND

Many people own or use multiple electronic devices, such as personal computers, smartphones, tablet computers, and the like. Each of these devices may be configured to require authentication before they are unlocked for use; this authentication may include a password, pattern, fingerprint, other biometric information, or similar authentication information. The user may opt to require this authentication (e.g., for a personal device), or it may be required by an employer or other agency (e.g., for a work device). Selecting, maintaining, remembering, and entering this authentication information may, however, be time-consuming and frustrating for the user.

DETAILED DESCRIPTION

Figure 1A:
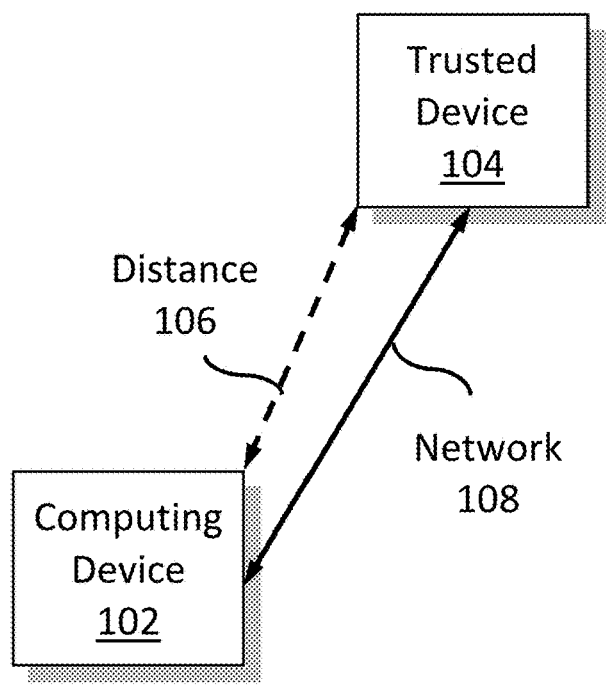
FIGS. 1A, 1B, and 1C illustrate example embodiments of computing environments for maintaining user authentication with a trusted device.

In various embodiments, when a user of a computing device such as a smartphone, tablet computer, laptop computer, wearable computer, or similar device is using another trusted device such as a smartphone, tablet computer, desktop computer, laptop computer, network-connected lock, network-connected door, network-connected light, or similar device proximate to the computing device, one device may use the other to maintain user presence and reduce or eliminate the number of re-authentication procedures required for either or both devices. The computing device may time-out, activate a lock screen, and require re-authentication after a certain amount of time (e.g., two minutes) of no use (e.g., no received keyboard, touchscreen, voice, or other user input), while the trusted device may time-out after the same or different period of time (e.g., fifteen minutes) of no use. Maintaining user presence and reducing the number of re-authentication procedures required may lead to a more enjoyable and less frustrating user experience as well as increased security—the user may be encouraged to maintain longer, more diverse, and therefore more secure passwords if the user is not required to enter them repeatedly.

In various embodiments, if the devices are proximate to each other and the user is providing input to, carrying, or otherwise using one device (e.g., either the computing device or the trusted device) at least once every two minutes (or whatever the time-out time of the computing device is), the devices communicate such that the idle device that would otherwise time-out and lock remains authenticated and open to the user. In other words, the computing device may remain unlocked while the user is using the trusted device, and/or the trusted device may remain unlocked while the user is using the computing device (subject to, in some embodiments, the conditions and requirements described herein). For illustrative purposes, some of the embodiments described herein refer to the use of a smartphone as the computing device and of a personal computer as the trusted device, but the embodiments are not limited to only these devices or to only the use of two devices—one of skill in the art will understand that the scope of the embodiments extends to any number of any kind of devices.

In some embodiments, the computing device also or in addition detects whether it has been placed in a clothing pocket, carrying case, arm band, or similar compartment in or on a clothing article, other article worn by the user, or other accessory (such as a purse, backpack, or other bag). The computing device may further detect if it is simply covered (i.e., out of a line of sight of the user and/or third party) by, for example, paper, folders, cloth, or any other article. As the terms are used herein, "container" or "pocket" refers to any object that wholly or partially obstructs the computing device from view.

If a length of time greater than that of the computing device and/or trusted device time-out time elapses without user input to either device, embodiments may thereafter check to see if the computing device is present in the user's pocket; if so, the computing device may check for an on-body state (i.e., held, carried, or otherwise present on the body of the user) for another length of time (e.g., five minutes). If the computing device detects that it is not present in a pocket of the user after the time-out time of the smartphone elapses, the computing device may lock or may check for an on-body state for another length of time (e.g., thirty seconds) thereafter (i.e., the computing device is not in a pocket but is being held by the user). The computing device may remain unlocked for any length of time while it is in the user's pocket and/or being held.

Figure 1B:
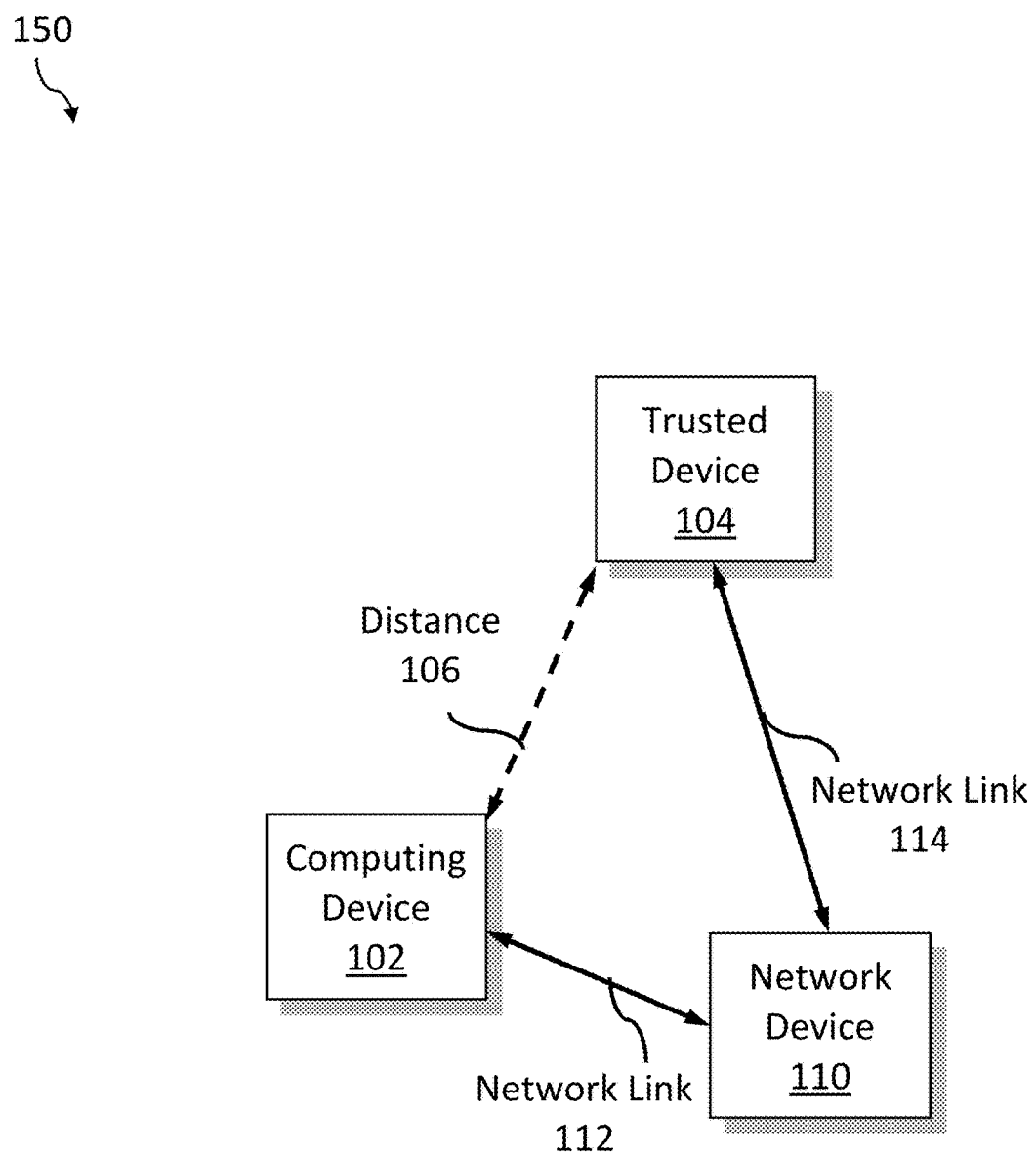
Figure 1C:
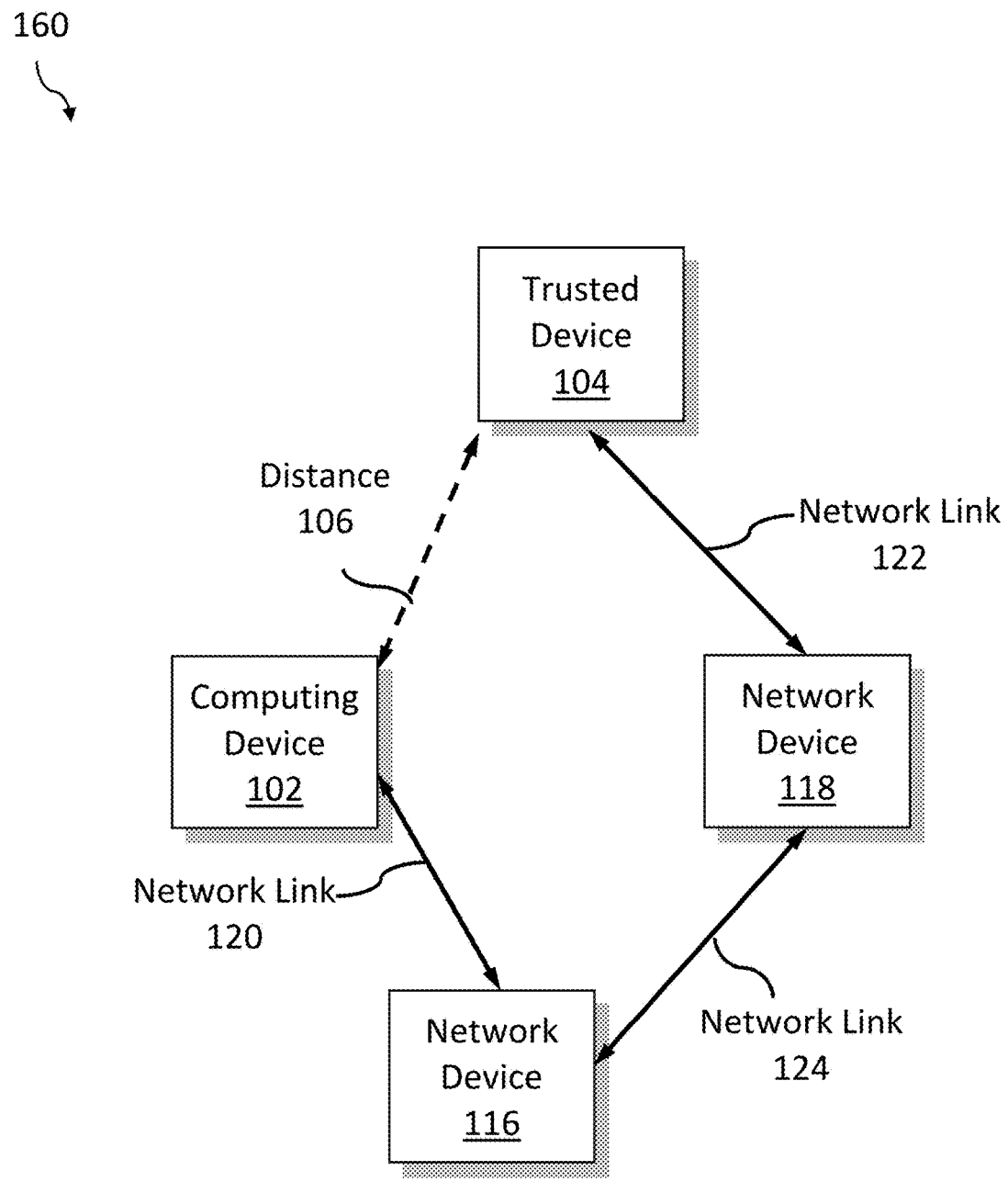

FIGS. 1A, 1B, and 1C illustrate various embodiments of computing environments 100, 150, 160 in accordance with embodiments described herein. Referring to FIG. 1A, a computing device 102 is proximate to a trusted device 104 and separated by a distance 106. As mentioned above, the computing device 102 may be smartphone, tablet computer, wearable computer, laptop computer, or similar device; the trusted device may be a smartphone, tablet computer, desktop computer, laptop computer, network-connected lock, network-connected door, network-connected light, or similar device. The distance 106 may be any distance; in some embodiments, the distance is 0-15 feet. In some embodiments, as described in greater detail below, the maximum distance 106 varies based on user preference, organizational security policy, or presence of the devices 102, 104 in a trusted or untrusted environment.

In the environment 100 of FIG. 1A, the devices 102, 104 are connected directly together via a direct network link 108. The network link 108 may use any networking protocol known in the art; in various embodiments, the network link 108 comprises BLUETOOTH, BLUETOOTH LOW ENERGY, infrared, direct WI-FI, or near-field communication. The network link 108 may be activated manually by the user of the computing device 102 and/or trusted device 104 or may activate automatically when the devices 102, 104 are proximate to each other (e.g., when the devices 102, 104 are within 15 feet of each other). In some embodiments, the user activates the network link 108 manually one time, and the direct link 108 activates automatically thereafter.

FIG. 1B illustrates a computing environment 150 in accordance with embodiments described herein. In computing environment 150, the computing device 102 and trusted device 104 are separated by a distance 106 and communicate with a network device 110 over respective network links 112, 114. The network device 110 may be, for example, a wired or wireless router, switch, access point, or any other such device; the network links 112, 114 may be any wired or wireless link, such as WI-FI, ETHERNET, or other such protocol. In one example, the computing device 102 is a smartphone and communicates with the network device 110, which may be a wireless router, over a WI-FI link 112, and the trusted device 104 is a desktop computer and communicates with the network device 110 over an ETHERNET link 114.

FIG. 1C illustrates a computing environment 160 in accordance with embodiments described herein. In this environment 160, the computing device 102 and trusted device 104 are separated by a distance 106 and communicate with different network devices 116, 118 over respective network links 120, 122. The network devices 116, 118 communicate via a network link 124, which may include additional network devices or other network infrastructure. In one example, the computing device 102 is a smartphone and communicates with the network device 116, which may be a cellular tower or similar transmitter, over a cellular-network link 120, and the trusted device 104 is a desktop computer and communicates with the network device 118 using an ETHERNET link 122.

Figure 2:
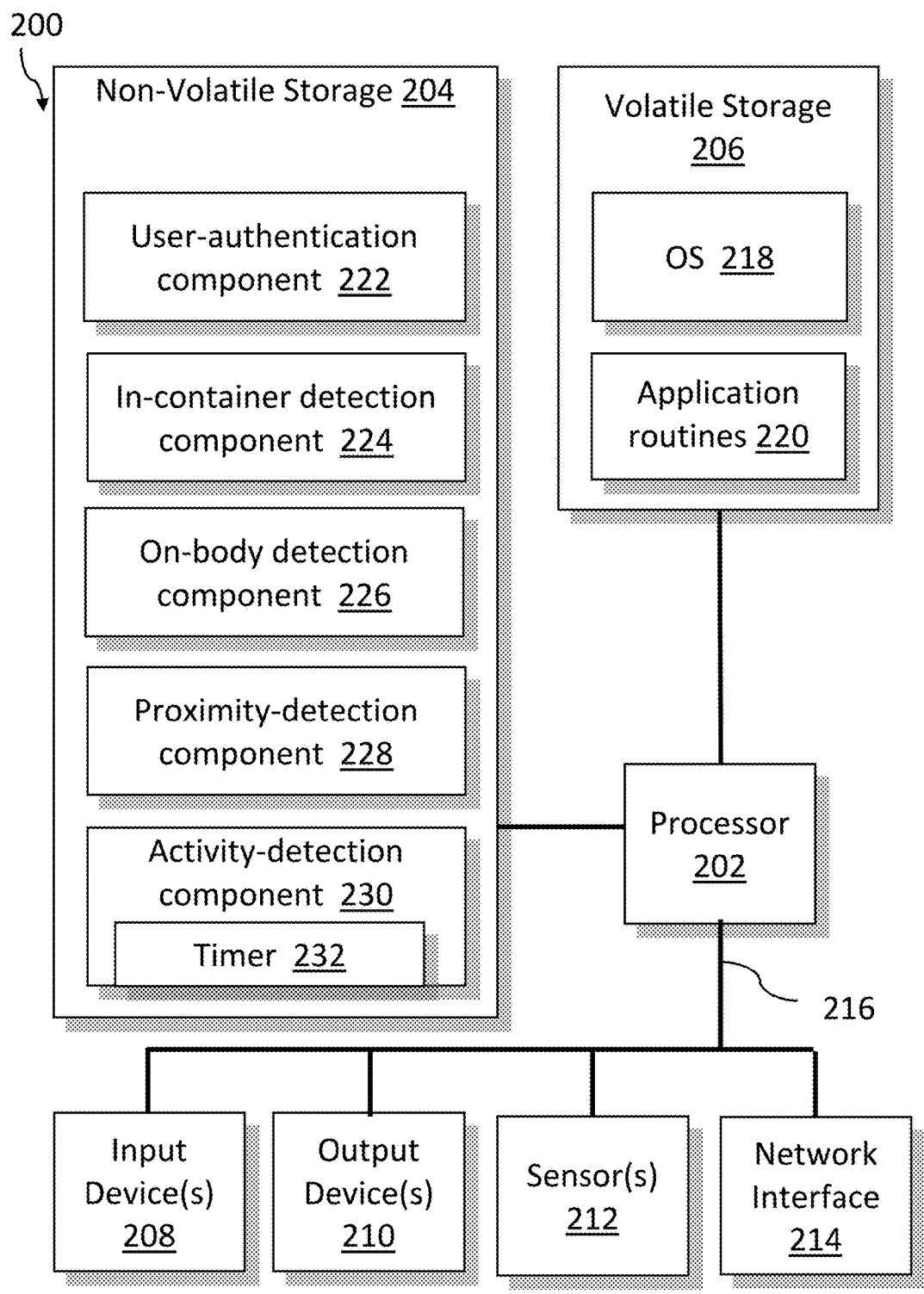
FIG. 2 illustrates an example embodiment of a computing device for maintaining user authentication with a trusted device.

FIG. 2 illustrates a computing device 200 in accordance with embodiments described herein. The computing device 200 may include a processor 202, non-volatile storage 204, volatile storage 206, one or more input devices 208, one or more output devices 210, one or more sensors 212, a network interface 214, and any other components or features, which may communicate via a link 216. The processor 202 may be any type of processing circuit such as a central-processing unit, digital-signal processor, application-specific integrated circuit, or similar processor, and may include one or units, cores, or co-processors, some or all of which may operate in a low-power mode. The non-volatile storage 204 may be any magnetic hard disk drive, solid-state hard disk driver, flash memory, or similar non-volatile storage or removable media such as a CD, DVD, or USB flash drive. The volatile storage 206 may be random-access memory such as DDR memory, read-only memory, or any other type of memory. The input device(s) 208 may include a keyboard, mouse, touchscreen, microphone, or any other similar input device. The output device(s) 210 may include a display such as an LCD monitor, a touchscreen, a speaker, a vibration generator, or any other similar output device. The sensor(s) 212 may include a light sensor, a camera, an orientation sensor such as a gyroscope, a motion sensor, a proximity sensor, a heart-rate sensor (which may include an optical sensor and/or a bioimpedance sensor), an accelerometer, or any other similar sensor. The network interface 214 may include a cellular transceiver, a WI-FI transceiver, a BLUETOOTH transceiver, an ETHERNET transceiver, or any other similar network interface. The link 216 may be any system bus, interconnect, network link, or similar link.

The volatile storage 206 may be used to store instructions to be executed by the processor 202, conceptually illustrated as a group of components. These components generally include an operating system 218 (e.g., a Microsoft WINDOWS, Linux, ANDROID, APPLE IOS, or APPLE OS X operating system) that directs the execution of low-level, basic system functions (such as memory allocation, file management, and the operation of mass storage devices), as well as higher-level application routines 220. The various components may be programmed in any suitable programming language, including, without limitation high-level languages such as C, C++, Java, Perl, Python, or Ruby or low-level assembly languages. The volatile storage 204 may further store input and/or output data associated with execution of the instructions as well as additional information used by the various application routines 220.

The application routines 220 may be stored on the non-volatile storage 204 and loaded into the volatile storage 206 for execution as needed. In various embodiments, the application routines 220 include a user-authentication component 222, an in-container detection component 224, an on-body detection component 226, a proximity detection component 228, and/or an activity-detection component 230 (which may include a timer 232). Each of these components are explained in greater detail below. One of skill in the art will understand, however, that the number and division of components 222-230 is not limiting, and the functionality of the components 222-230 may be combined into fewer components or divided into more components. The components 222-230 may be installed in the non-volatile storage 204 by any means, such as by downloading an application or "app" from an app store such as the GOOGLE PLAY STORE or APPLE ITUNES STORE and/or from a website, by transfer from a non-volatile medium such as a disk, CD, or DVD, or by any other means.

Figure 3:
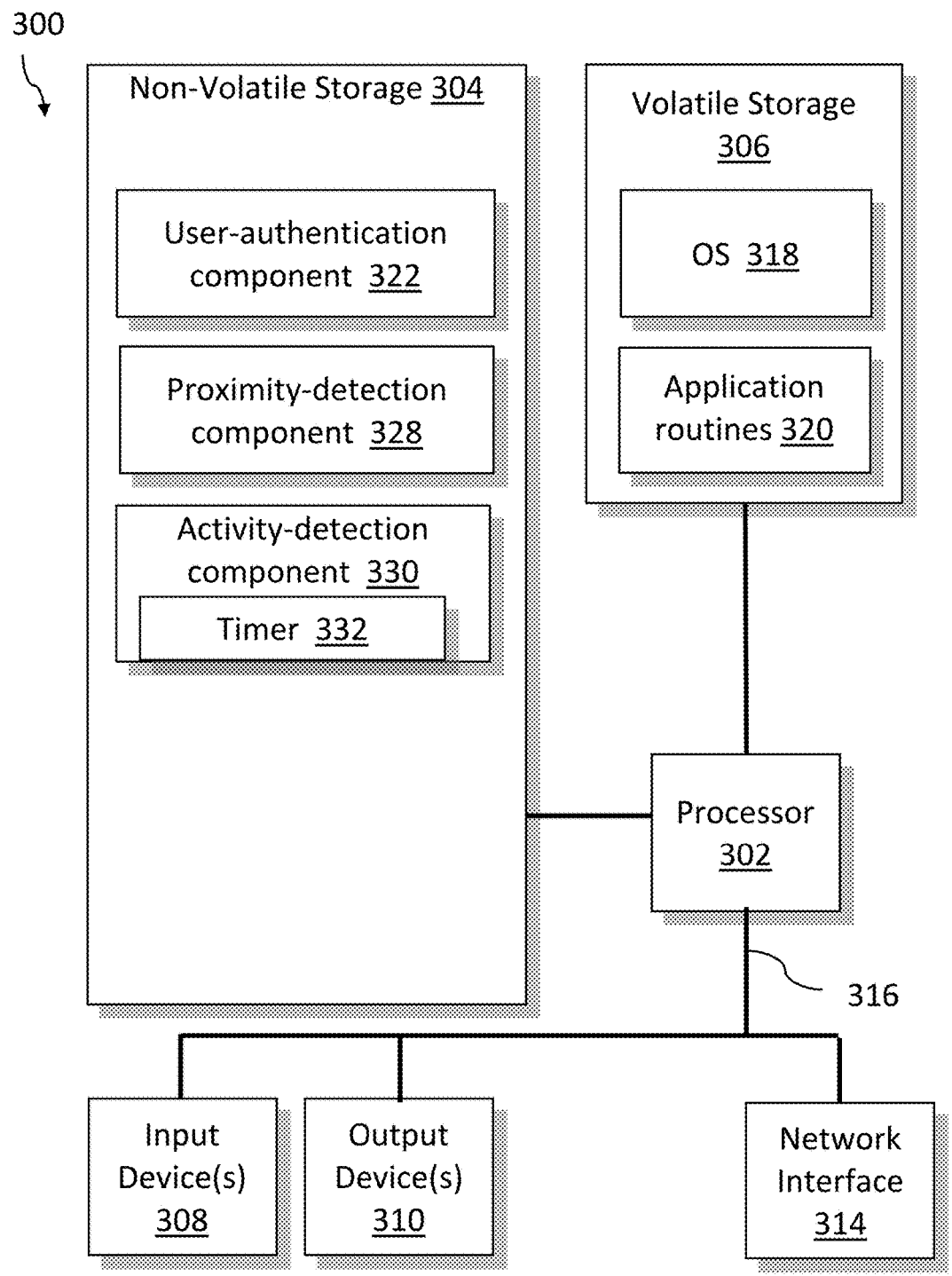
FIG. 3 illustrates an example embodiment of a trusted device.

FIG. 3 illustrates a trusted device 300 in accordance with embodiments described herein. Like the computing device 200, the trusted device 300 may include a processor 302, non-volatile storage 304, volatile storage 306, one or more input devices 308, one or more output devices 310, a network interface 314, and any other components or features, which may communicate via a link 316. The processor 302 may be any type of processing circuit such as a central-processing unit, digital-signal processor, application-specific integrated circuit, or similar processor, and may include one or units, cores, or co-processors, some or all of which may operate in a low-power mode. The non-volatile storage 304 may be any magnetic hard disk drive, solid-state hard disk driver, flash memory, or similar non-volatile storage or removable media such as a CD, DVD, or USB flash drive. The volatile storage 306 may be random-access memory such as DDR memory, read-only memory, or any other type of memory. The input device(s) 308 may include a keyboard, mouse, touchscreen, microphone, or any other similar input device. The output device(s) 310 may include a display such as an LCD monitor, a touchscreen, a speaker, or any other similar output device. The network interface 314 may include a cellular transceiver, a WI-FI transceiver, a BLUETOOTH transceiver, an ETHERNET transceiver, or any other similar network interface. The link 316 may be any system bus, interconnect, network link, or similar link.

The trusted device 300 may differ from the computing device 200 in that the trusted device 300 may not include one or more of the sensor(s) 212 included in the computing device 200. In particular, if the trusted device 300 is a desktop computer, laptop computer, or network-connected door, lock, or light, the trusted device 300 may not include a light sensor, motion sensor, accelerometer, orientation sensor, or other similar sensor normally associated with mobile devices such as smartphones and tablets. Embodiments described herein are not limited only to trusted devices 300 that lack these sensors, however, and in other embodiments, the trusted device 300 is a mobile device similar to the computing device 200.

The volatile storage 306 may be used to store instructions to be executed by the processor 302, conceptually illustrated as a group of components. These components generally include an operating system 318 (e.g., a Microsoft WINDOWS, Linux, ANDROID, APPLE IOS, or APPLE OS X operating system) that directs the execution of low-level, basic system functions (such as memory allocation, file management, and the operation of mass storage devices), as well as higher-level application routines 320. The various components may be programmed in any suitable programming language, including, without limitation high-level languages such as C, C++, Java, Perl, Python, or Ruby or low-level assembly languages. The volatile storage 304 may further store input and/or output data associated with execution of the instructions as well as additional information used by the various application routines 320.

The application routines 320 may be stored on the non-volatile storage 304 and loaded into the volatile storage 306 for execution as needed. In various embodiments, the application routines 320 include a user-authentication component 322, a proximity detection component 328, and/or an activity-detection component 330 (which may include a timer 332). Each of these components are explained in greater detail below. One of skill in the art will understand, however, that the number and division of components 322-332 is not limiting, and the functionality of the components 322-332 may be combined into fewer components or divided into more components. The components 322-332 may be installed in the non-volatile storage 304 by any means, such as by downloading an application or "app" from an app store such as the GOOGLE PLAY STORE or APPLE ITUNES STORE and/or from a website, by transfer from a non-volatile medium such as a disk, CD, or DVD, or by any other means.

As used in this application, the terms "system" and "component" are intended to refer to a hardware and/or software device in which digital processing is carried out, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire device (e.g., an entire computer). One or more components can reside within a process and/or thread of execution, and a component may be localized on one device and/or distributed between two or more devices. Further, components may be communicatively coupled to each other by various types of communications media to coordinate operations.

With reference to both FIGS. 2 and 3, in various embodiments, the user-authentication component 222 authenticates the user to the computing device 200 by prompting the user for authentication information. Similarly, the user-authentication component 322 may authenticate the user to the trusted device 300. The authentication information may be a password, passcode, pattern, fingerprint, voice print, image, or any other similar authentication information. The user-authentication component 222, 322 may activate the prompt in response to the user pressing an input device 208, 308 such as a key or button, in response to a voice command from the user as sensed by a sensor 212, in response to the user picking up the device 200 as detected by a sensor 212, or by any other such action. The user-authentication component 222, 322 may then compare the authentication information to previously-entered authentication information and, if the received authentication information matches the stored authentication information, unlock the computing device 200 and/or trusted device 300. Unlocking the computing device 200 and/or trusted device 300 may include transitioning a display of the computing device 200 and/or trusted device 300 from a locked state to an unlocked state, an example of which appears below.

The in-container detection component 224 may determine whether the computing device 200 is disposed in a container by collecting information from one or more of the sensor(s) 212, such as a light sensor, camera, proximity sensor, accelerometer, and/or orientation sensor. For example, the in-container detection component 224 may report that the computing device 200 is present in a container if its light sensor reports a light level below a threshold (e.g., five lumens), if its proximity sensor reports an object proximate within a threshold (e.g., five millimeters), and/or an orientation that correlates to the computing device 200 being held in a pocket (e.g., within five degrees of horizontal).

In some embodiments, the in-container detection component 224 distinguishes between the computing device 200 being placed in a container and the computing device 200 simply being placed face-down on a surface (or otherwise having a sensor 212 positioned such that it erroneously reports information suggesting that it is placed in a container). If, for example, the light sensor is on a front face of the computing device 200, the light sensor may report a low level of light consistent with the computing device 200 being placed in a container if the computing device 200 is placed face-down on a surface.

In some embodiments, other sensors 212 are used to corroborate the container status if one or more sensors are known to report such erroneous results. If the light sensor reports a low level of light, for example, the in-container detection component 224 may check the orientation of the phone and report a non-container status if the orientation is horizontal and face-down.

The history of data collected from the sensor(s) 212 may further be used to determine whether the computing device 200 is disposed in a container. For example, the orientation sensor history may be used to determine if the computing device 200 was in a vertical orientation (or nearly vertical) prior to the light sensor reporting a drop in light received—corresponding to the user orienting the computing device 200 vertically to place it in his or her pocket.

In some embodiments, instead of or in addition to detecting whether the computing device 200 is disposed in the pocket of the user, the in-container detection component 224 detects whether the smartphone has been placed on a surface such as a desk using, for example, orientation sensors or systems and if it is receiving vibrations generated by the user, such as vibrations from handwriting. The in-container detection component 224 may wait for a particular amount of time (e.g., five minutes) to determine if vibrations are occurring; if not, the computing device 200 is locked. In some embodiments, if the computing device 200 is in a public or heavily-trafficked location, this feature is disabled due to too much background vibration from third-party sources.

The on-body detection component 226 may receive data from an on-body detection sensor, which may be a sensor 212, to determine if the computing device 200 is disposed on the body of the user. For example, a sensor 212 may be a motion sensor, accelerometer, and/or gyroscope, and the on-body detection component 226 determines that the computing device 200 is disposed on the body of the user if motion, acceleration, or other movement is sensed within a certain time (for example, five minutes). A sensor 212 may instead or in addition be a heart-rate sensor; the heart-rate sensor may detect the heart rate of the user by, for example, reflecting and/or transmitting light from and/or through the body of the user and sensing the reflected and/or transmitted light or by measuring the bioresistance of the body of the user by, for example, transmitting a current through the skin of the user with one or more electrodes. If the heart rate of the user is sensed within a certain time (for example, five minutes), the on-body detection component 226 determines that the computing device 200 is disposed on the body of the user. Any type of sensor 212 may be used as the on-body detection sensor, however, and the embodiments described herein are not limited to any type of sensor 212.

In some embodiments, the proximity-detection component 228, 328 determines if the computing device 200 and the trusted device 300 are proximate to each other (within, e.g., 0-15 feet) based on a network connection therebetween. The proximate state of the devices may be detected, for example, by a successful direct connection therebetween of a limited-range networking protocol as depicted in FIG. 1A or by connection to a common network, as depicted in FIG. 1B. In other embodiments, the proximity-detection component 228 determines that the devices are proximate by determining the location of the devices using, for example, global-positioning system data, cellular-tower triangulation, or by any other means; these methods may be used when the computing device 200 and trusted device 300 are connected to different network devices, as depicted in FIG. 1C.

In some embodiments, if the proximity-detection component 228, 328 determines that the computing device 200 is proximate to a trusted device 300, one or both of the devices 200, 300 are automatically unlocked. In some embodiments, one device is automatically unlocked when the user unlocks the other device; in other embodiments, both devices 200, 300 are automatically unlocked when they are proximate to each other.

In some embodiments, the proximity requirement of the computing device 200 and trusted device 300 varies based on the context of the devices and whether they are placed in a trusted or vulnerable environment. For example, the proximity-detection component 228 may detect or be informed (e.g., by the user or a system administrator) that the devices are disposed in a trusted environment such as a workplace or private domicile. In these cases, the proximity requirement may be relaxed such that the devices are deemed proximate if they are relatively (e.g., fifteen feet) close. In vulnerable environments such as cafes, parks, libraries, and similar public or shared spaces, however, the proximity requirement may be lessened to, for example, five feet. In some embodiments, the proximity requirement defaults to the public setting (e.g., five feet) unless and until set to a greater one by the user or system administrator.

In some embodiments, the proximity-detection component 228 detects if the computing device 200 and trusted device 300 become separated by a distance greater than a threshold distance (e.g., fifteen feet) and therefore lock the computing device 200 and/or trusted device 300. The smartphone application and/or proximity-detection component 228 may similarly lock the computing device 200 and/or trusted device 300 if an acceleration of the smartphone exceeds a threshold, implying that a third party has maliciously snatched the computing device 200 from the desk, pocket, or person of the user, even if the distance between the computing device 200 and trusted device 300 has not yet exceeded the threshold. Similarly, the proximity-detection component 228 may lock the computing device 200 and/or trusted device 300 if a behavior pattern of use of either device does not match a behavior pattern of the user, implying that someone other than the user is using the device.

The activity-detection component 230, 330 may detect and monitor activity of the user with respect to the computing device 200 and/or trusted device 300. As the user interacts with either or both devices 200, 300 (including periods of time in which the user does not interact with either device 200, 300), the activity-detection component 230, 330 tracks a length of time since a last interaction using a timer 232, 332. The interaction may be, for example, pressing a keyboard key, moving a mouse, touching or gesturing on a touchscreen, or other such input. Each device 200, 300 may have a time-out time; if the length of time since the last interaction exceeds this time, the activity-detection component 230, 330 transitions a display of the device 200, 300 from an unlocked to a locked state. The time-out times of the devices 200, 300 may be the same or different. In some embodiments, the time-out time of the computing device 200 is shorter than that of the trusted device 300 (e.g., the time-out time of the computing device 200 may be two minutes, while the time-out time of the trusted device may be fifteen minutes).

The above-mentioned thresholds and timespans may be predetermined; in some embodiments, the thresholds and timespans are developed via user feedback and adjustment (i.e., machine learning). The thresholds and timespans may be the same for all users, for groups of users (grouped by, for example, type of use (business or personal), user sex or gender, user language, user region or country, or any other grouping) or set individually for each user. If one source of sensor data (e.g., the orientation sensor) proves to be a less reliable indication of the in-pocket state of the computing device 200, that source may be ignored or its emphasis lessened (by, e.g., applying a smaller weighting factor than data from other sources).

The in-container detection component 224, on-body detection component 226, and/or other components may monitor one or more sensors 212 in a low-power mode of the processor 202. In various embodiments, the low-power mode entails the use of a low-power processor, co-processor, processor core, or similar circuit that monitors the status of the sensors, collects data from the sensors 212, and/or processes data from the sensors 212 without requiring that the full processing system of the computing device 202 be awake and operating at full power. In various embodiments, the in-container detection component 224 and/or on-body detection component 226 "wakes" the processing system periodically (e.g., ever thirty seconds, minute, or two minutes) to analyze the data and information collected from the sensors 212 during the low-power mode. The low-power processor, co-processor, or processor core may instead or in addition operate in a secure mode such that data collected from the sensors is protected from malicious attacks and gathering from other applications executing on the smartphone or other computing systems.

In some embodiments, the user authentication component 222, 322 locks a display of the computing device 200 and/or trusted device 300 if the network connection therebetween is lost. In other embodiments, the user authentication component 222, 322 employs a grace period if the network connection therebetween (e.g., a BLUETOOTH connection) is disrupted, disabled, or otherwise becomes available to thereby tolerate an erratic, noisy, or otherwise imperfect connection. For example, if the network connection is lost, the user authentication component 222, 322 may wait a certain amount of time (e.g., 100 milliseconds, one second, or five seconds) for the connection to re-establish itself. If the connection is not re-established after the grace period expires, the computing device 200 and/or trusted device 300 is locked.

Figure 4:
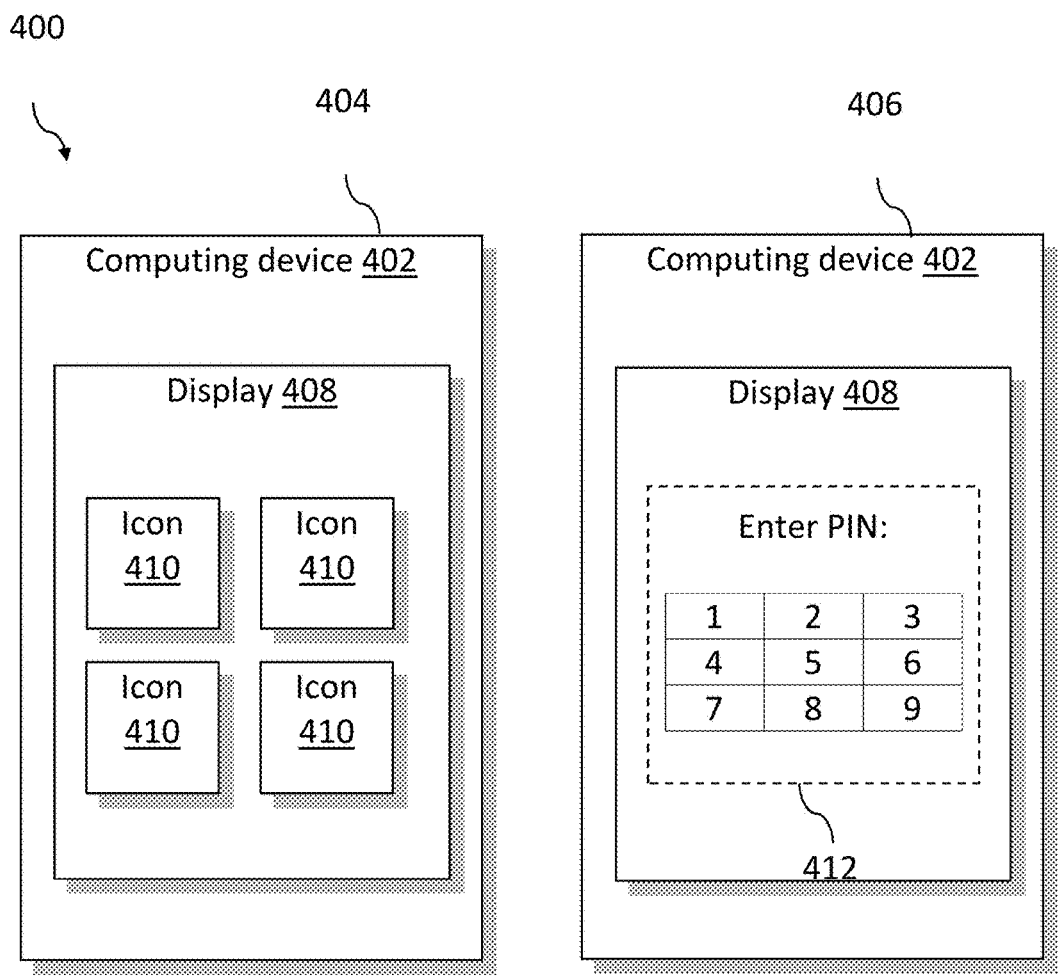
FIG. 4 illustrates an example embodiment of a computing device having locked and unlocked states.

FIG. 4 is an illustration 400 of a computing device 402 in an unlocked state 404 and in a locked state 406. In the unlocked state 404, the display 408 displays user-interface elements such as icons 410, applications, personal information, etc. as configured by the user. In the locked state 406, some or all of the user-interface elements are obscured, and instead an authentication prompt 412 is displayed. In this embodiment, the authentication prompted is an access-code prompt, and the authentication information is a series of digits. While the user interacts with the computing device 402, it remains in the unlocked state 404. If, however, the user does not interact with the computing device 402 for a length of time exceeding the time-out time of the computing device 200, the display 408 transitions to the locked state 406. If the user enters the series of digits into the prompt 412 that matches a previously set series of digits, the display 408 of the computing device 402 transitions back to the unlocked state 404. In accordance with the embodiments described herein, the display 408 of the computing device 402 may remain in the unlocked state 404 even if the user is inactive with respect to the computing device 402 for a time longer than the time-out time of the computing device 402 if the user is active with respect to a trusted device.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
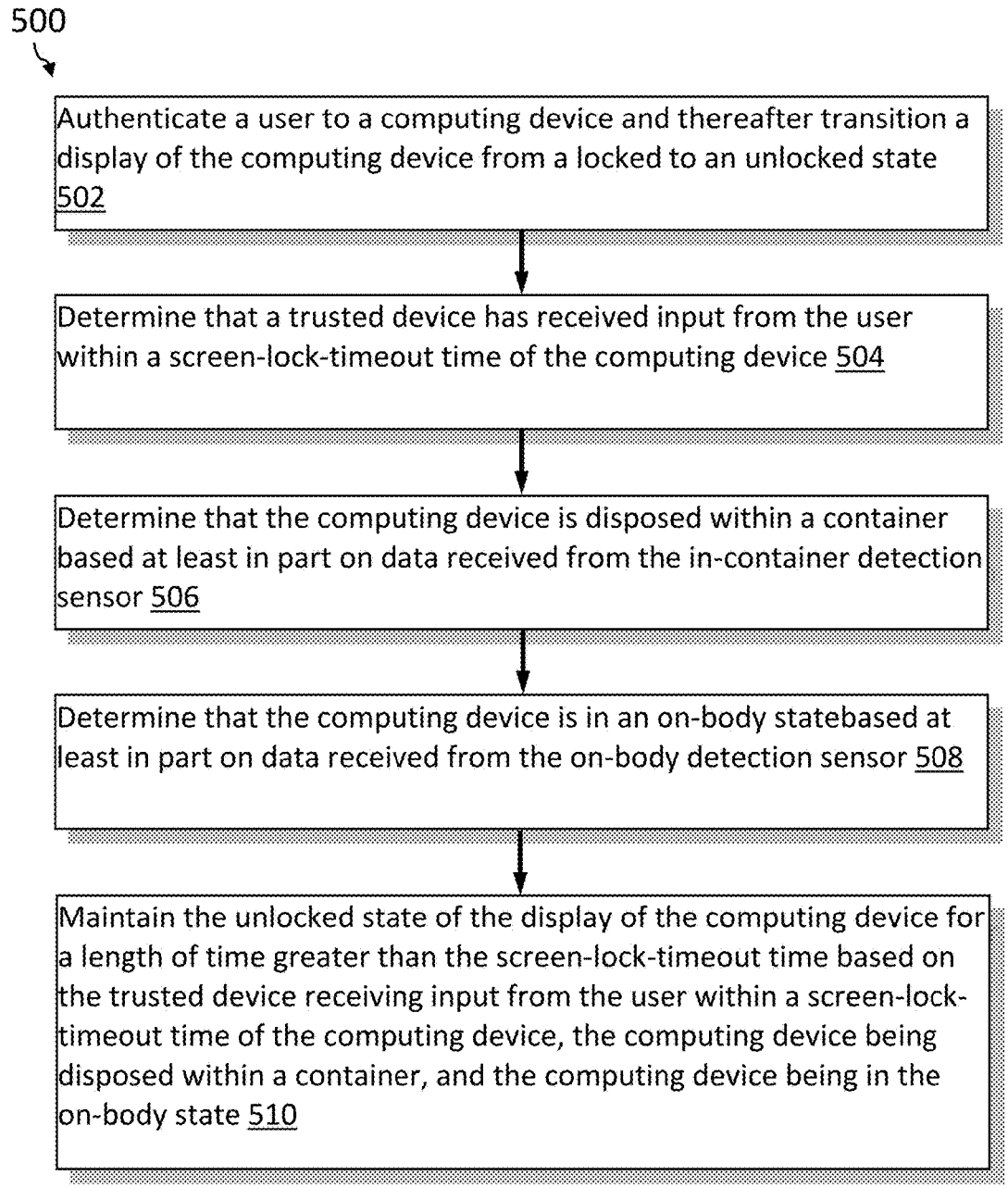
FIGS. 5 and 6 illustrate example embodiments of methods for maintaining user authentication with a trusted device.

FIG. 5 illustrates a flow diagram 500 in accordance with embodiments described herein. The user is authenticated (502) to the computing device and, thereafter, a display of the computing device is transitioned from a locked to an unlocked state. It is determined (504) that a trusted device has received input from the user within a screen-lock-timeout time of the computing device. It is determined (506) that the computing device is disposed within a container based at least in part on data received from the in-container detection sensor. It is determined (508) that the computing device is disposed on the body of the user based at least in part on data received from the on-body detection sensor. Based on the trusted device receiving input from the user within a screen-lock-timeout time of the computing device, the computing device being disposed within a container, and the computing device being disposed on the body of the user the unlocked state of the display of the computing device is maintained (510) for a length of time greater than the screen-lock-timeout time.

Figure 6:
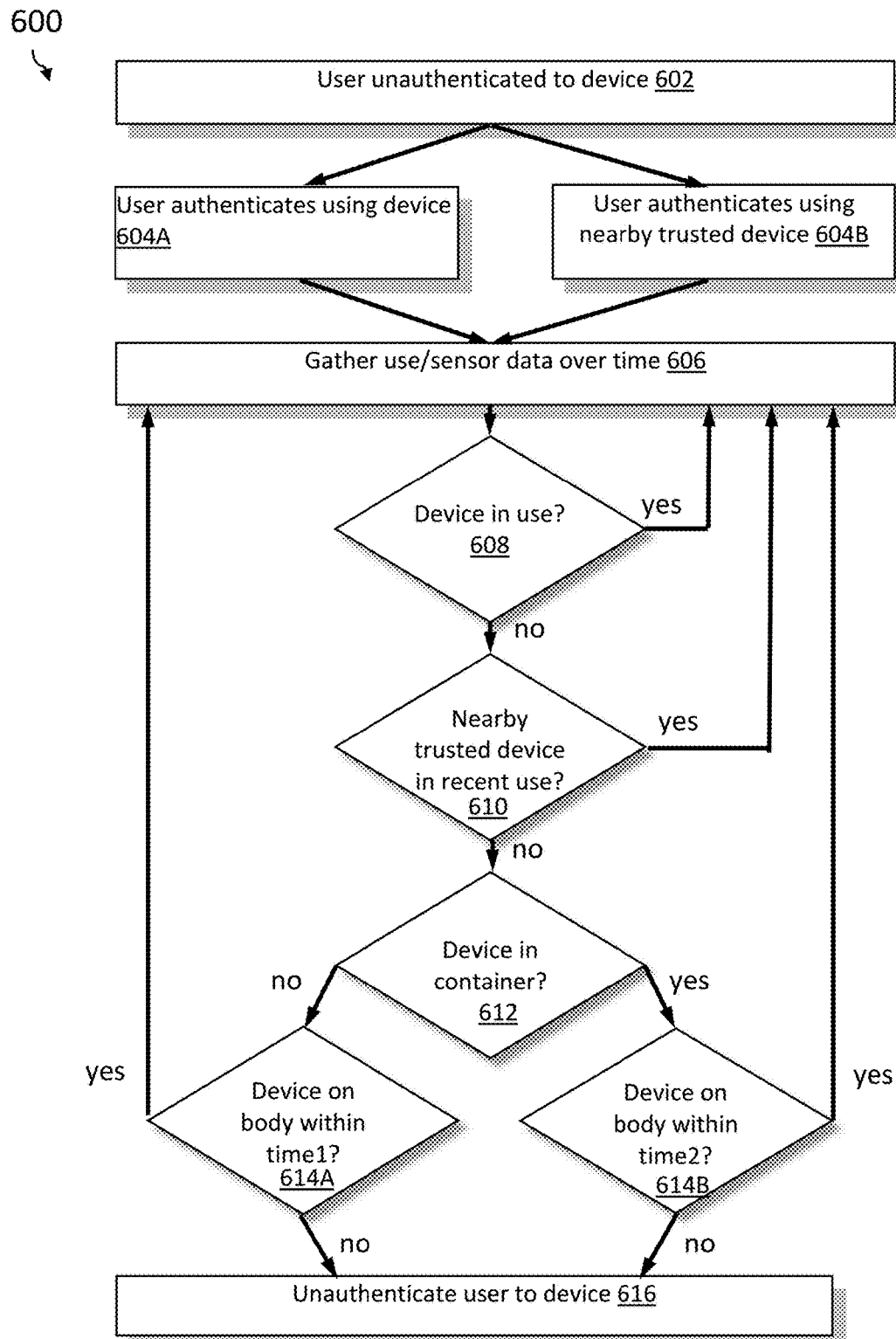

FIG. 6 illustrates a flow diagram 600 in accordance with embodiments disclosed herein. A user is unauthenticated (602) to a device 602 such as a smartphone or tablet computer. The user may authenticate (604A) to the device directly by entering authentication information into the device and/or by authenticating (604B) to a nearby trusted device, such as a desktop computer or laptop computer. Once authenticated to the device, the device gathers (606) use and sensor data over time (e.g., 30 seconds) before proceeding through the flow 600. If the device is in use (608) (i.e., the user is interacting with the device by, e.g., providing input, the flow returns to the data-gathering step (606). If, on the other hand, the device is not in use, a nearby trusted device is checked for recent use (610); recent use may be use within two minutes, and "nearby" may be defined as within fifteen feet. If the nearby trusted device is in use, the flow 600 returns to the data-gathering step (606). If, however, the nearby trusted device is not in use, the device is checked (612) to see if it is in a container such as a pocket. If it is not, and if the device is detected on the body of the user (614A) within a time "time1" (e.g., 30 seconds), the flow 600 returns to the data-gathering step (606). If it is in a container, and if the device is detected on the body of the user (614B) within a time "time2" (e.g., five minutes), the flow 600 returns to the data-gathering step (606). If the device is not on the body of the user within either of the times time1 or time2 in the preceding steps, the user is unauthenticated (616) to the device, and a display of the device transitions from an unlocked state to a locked state.

For example, corresponding to step (610), if the device is not in use because, for example, the user placed the device on his or her desk next to the nearby trusted device or in a pocket, the device may remain unlocked past the time-out time of the device if the user interacts with the nearby trusted device within a given time-out time of the device (e.g., two minutes). If, however, the device is not in use and the nearby trusted device is also not in use within the time-out time of the device (e.g., two minutes), the display of the device may not lock. Instead, the device is checked for in-container status (step 612) and thereafter checked for an on-body state (steps 614A and 614B). If the device is in a container such as a pocket, the device waits five minutes before locking to detect the on-body state; if the on-body state is detected during this time, the display of the device remains unlocked. If the device is not in a container such as a pocket, the device waits 30 seconds before locking to detect the on-body state; if the on-body state is detected during this time, the display of the device remains unlocked.

Figure 7:
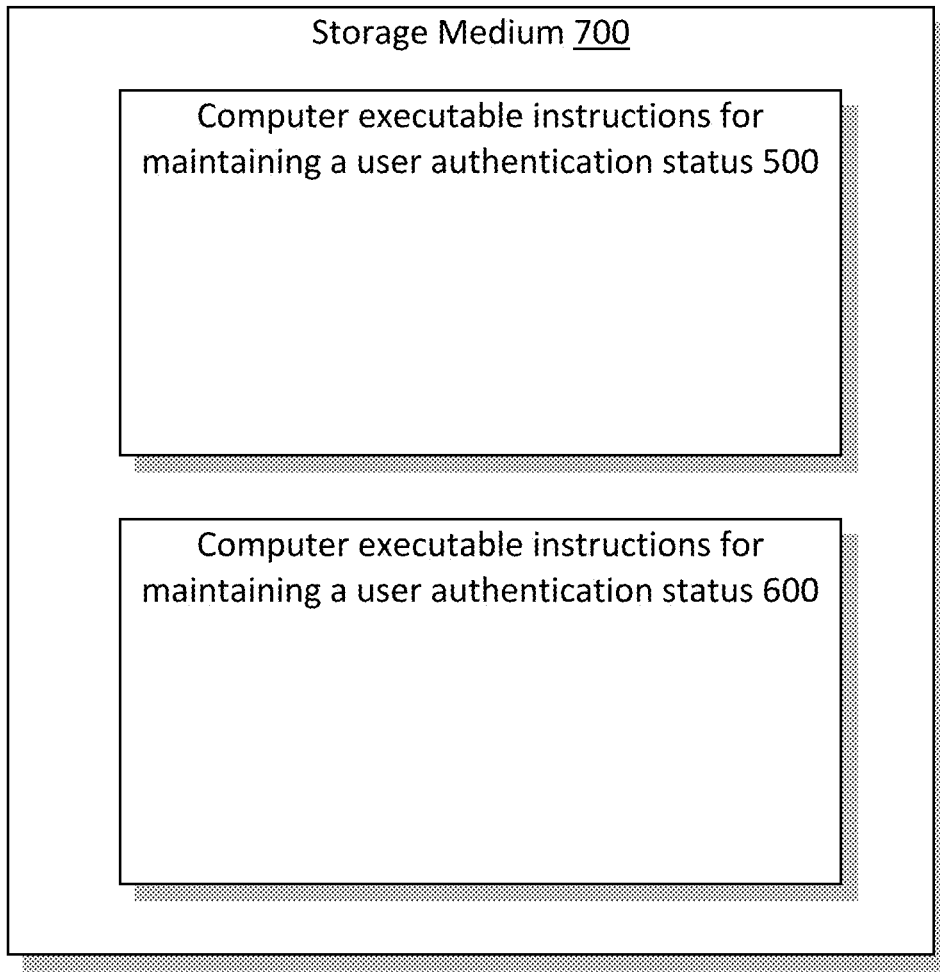
FIG. 7 illustrates an example storage medium that includes instructions for maintaining user authentication with a trusted device.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flows 500, 600 described above with reference to FIGS. 5 and 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Example 1 is an apparatus for maintaining a user authentication status comprising a processor circuit; a network interface to exchange data communications with a trusted device; an activity-detection component to determine whether the trusted device has received user input within a screen-lock-timeout time of the apparatus; an in-container detection component to determine whether the apparatus is disposed within a container based at least in part on data received from an in-container detection sensor; an on-body detection component to determine whether the apparatus is in an on-body state based at least in part on data received from an on-body detection sensor; and a user-authentication component to authenticate the user to the apparatus and thereafter transition a display of the apparatus from a locked state to an unlocked state and to maintain the unlocked state of the display of the apparatus for a length of time greater than the screen-lock-timeout time based on a determination that the trusted device has received user input user within the screen-lock-timeout time of the apparatus, a determination that the apparatus is disposed within the container, and a determination that the apparatus is in the on-body state.

Example 2 includes the subject matter of example 1, where the network interface comprises a direct network link between the apparatus and the trusted device or an indirect network link comprising a network device.

Example 3 includes the subject matter of example 1, where the on-body detection component is further configured to determine that the apparatus is not in the on-body state based at least in part on data received from the on-body detection sensor and, thereafter, to transition the display of the apparatus from the unlocked state to the locked state.

Example 4 includes the subject matter of example 1, where the lengths of time spent to determine that the trusted device has received input from the user, to determine that the apparatus is disposed within a container, and to determine that the apparatus is in the on-body state are predetermined or developed by machine learning.

Example 5 includes the subject matter of example 1, where the in-container detection component is configured to distinguish the on-body state from the apparatus being disposed face-down on a surface.

Example 6 includes the subject matter of example 1, where the user-authentication component is configured to determine that the apparatus and trusted device are within a distance of each other and to transition the display of the apparatus or trusted device from a locked state to an unlocked state.

Example 7 includes the subject matter of example 6, the distance comprising a first distance in a trusted environment and a second distance shorter than the first distance in an untrusted environment.

Example 8 includes the subject matter of example 1, where the user-authentication component is configured to transition the display of the apparatus from the unlocked state to the locked state if a distance between the apparatus and the trusted device exceeds a threshold, if an acceleration of the apparatus exceeds a threshold, or if a network connection between the apparatus and the trusted device is lost.

Example 9 includes the subject matter of example 1, where the apparatus comprises a smartphone and the trusted device comprises a desktop computer.

Example 10 includes the subject matter of example 1, where the user-authentication component is configured to collect data for an amount of time before re-determining that the trusted device has received input from the user within the screen-lock-timeout time of the computing device.

Example 11 includes the subject matter of example 10, where the amount of time comprises 30 seconds.

Example 12 includes the subject matter of example 1, where the user-authentication component configured to determine that the computing device is disposed on the body of the user is further configured to collect data from the on-body detection sensor for an amount of time.

Example 13 includes the subject matter of example 12, where the amount of time is five minutes.

Example 14 includes the subject matter of example 1, where the user-authentication component is configured to determine that the computing device is not disposed within the container based at least in part on data received from the in-container detection sensor and, thereafter, to determine within an amount of time that the computing device is disposed on the body of the user based at least in part on data received from the on-body detection sensor.

Example 15 includes the subject matter of example 14, where the amount of time comprises 30 seconds.

Example 16 includes the subject matter of example 1, where the in-container detection sensor comprises a proximity, light, or orientation sensor.

Example 17 includes the subject matter of example 1, where the on-body detection sensor comprises an orientation, motion, or acceleration sensor.

Example 18 includes the subject matter of example 1, where the container comprises a pocket, purse, or bag.

Example 19 is a computer-implemented method for maintaining a user authentication status comprising authenticating a user to the computing device and thereafter transitioning a display of the computing device from a locked state to an unlocked state; determining that a trusted device in electronic communication with the computing device has received input from the user within a screen-lock-timeout time of the computing device; determining that the computing device is disposed within a container based at least in part on data received from an in-container detection sensor; determining that the computing device is in an on-body state based at least in part on data received from an on-body detection sensor; and maintaining the unlocked state of the display of the computing device for a length of time greater than the screen-lock-timeout time based on the trusted device receiving input from the user within the screen-lock-timeout time of the computing device, the computing device being disposed within the container, and the computing device being in the on-body state.

Example 20 includes the subject matter of example 19, further comprising communicating between the computing device and trusted device using a network interface comprising a direct network link between the computing device and the trusted device or an indirect network link comprising a network device.

Example 21 includes the subject matter of example 19, further comprising determining that the computing device is not in the on-body state based at least in part on data received from the on-body detection sensor and, thereafter, transitioning the display of the computing device from the unlocked state to the locked state.

Example 22 includes the subject matter of example 19, where the lengths of time spent to determine that the trusted device has received input from the user, to determine that the computing device is disposed within a container, and to determine that the computing device is in the on-body state are predetermined or developed by machine learning.

Example 23 includes the subject matter of example 19, further comprising distinguishing the on-body state from the computing device being disposed face-down on a surface.

Example 24 includes the subject matter of example 19, further comprising determining that the computing device and trusted device are within a distance of each other and transitioning the display of the computing device or trusted device from a locked state to an unlocked state.

Example 25 includes the subject matter of example 24, where the distance comprises a first distance in a trusted environment and a second distance shorter than the first distance in an untrusted environment.

Example 26 includes the subject matter of example 19, further comprising transitioning the display of the computing device from the unlocked state to the locked state if a distance between the computing device and the trusted device exceeds a threshold, if an acceleration of the computing device exceeds a threshold, or if a network connection between the computing device and the trusted device is lost.

Example 27 includes the subject matter of example 19, further comprising collecting data for an amount of time before re-determining that the trusted device has received input from the user within the screen-lock-timeout time of the computing device.

Example 28 includes the subject matter of example 10, where the amount of time comprises 30 seconds.

Example 29 includes the subject matter of example 19, further comprising collecting data from the on-body detection sensor for an amount of time.

Example 30 includes the subject matter of example 29, where the amount of time comprises five minutes.

Example 31 includes the subject matter of example 19, further comprising determining that the computing device is not disposed within the container based at least in part on data received from the in-container detection sensor and, thereafter, determining within an amount of time that the computing device is disposed on the body of the user based at least in part on data received from the on-body detection sensor.

Example 32 includes the subject matter of example 31, where the amount of time comprises 30 seconds.

Example 33 includes the subject matter of example 19, where the in-container detection sensor comprises a proximity, light, or orientation sensor.

Example 34 includes the subject matter of example 19, where the on-body detection sensor comprises an orientation, motion, or acceleration sensor.

Example 35 includes the subject matter of example 19, where the container comprises a pocket, purse, or bag.

Example 36 is a tangible machine-readable storage medium comprising instructions that, when executed by a processing device, cause the processing device to: authenticate a user to the computing device and thereafter transition a display of the computing device from a locked state to an unlocked state; determine that the trusted device has received input from the user within a screen-lock-timeout time of the computing device; determine that the computing device is disposed within a container based at least in part on data received from an in-container detection sensor; determine that the computing device is in an on-body state based at least in part on data received from an on-body detection sensor; and maintain the unlocked state of the display of the computing device for a length of time greater than the screen-lock-timeout time based on the trusted device receiving input from the user within the screen-lock-timeout time of the computing device, the computing device being disposed within the container, and the computing device being in the on-body state.

Example 37 includes the subject matter of example 36, the instructions further comprising communicating between the computing device and trusted device using a network interface comprising a direct network link between the computing device and the trusted device or an indirect network link comprising a network device.

Example 38 includes the subject matter of example 36, the instructions further causing the processing device to determine that the computing device is not in the on-body state based at least in part on data received from the on-body detection sensor and, thereafter, transition the display of the computing device from the unlocked state to the locked state.

Example 39 includes the subject matter of example 36, where the lengths of time spent to determine that the trusted device has received input from the user, to determine that the computing device is disposed within a container, and to determine that the computing device is in the on-body state are predetermined or developed by machine learning.

Example 40 includes the subject matter of example 36, the instructions further causing the processing device to distinguish the on-body state from the computing device being disposed face-down on a surface.

Example 41 includes the subject matter of example 36, the instructions further causing the processing device to determine that the computing device and trusted device are within a distance of each other and transition the display of the computing device or trusted device from a locked state to an unlocked state.

Example 42 includes the subject matter of example 41, where the distance comprises a first distance in a trusted environment and a second distance shorter than the first distance in an untrusted environment.

Example 43 includes the subject matter of example 36, the instructions further causing the processing device to transition the display of the computing device from the unlocked state to the locked state if a distance between the computing device and the trusted device exceeds a threshold, if an acceleration of the computing device exceeds a threshold, or if a network connection between the computing device and the trusted device is lost.

Example 44 includes the subject matter of example 36, the instructions further causing the processing device to maintain the unlocked state of the display further comprising software instructions to collect data for an amount of time before re-determining that the trusted device has received input from the user within the screen-lock-timeout time of the computing device.

Example 45 includes the subject matter of example 44, where the amount of time comprises 30 seconds.

Example 46 includes the subject matter of example 36, the instructions further causing the processing device to determine that the computing device is disposed on the body of the user further comprising instructions to collect data from the on-body detection sensor for an amount of time.

Example 47 includes the subject matter of example 46, where the amount of time comprises five minutes.

Example 48 includes the subject matter of example 36, the instructions further causing the processing device to determine that the computing device is not disposed within the container based at least in part on data received from the in-container detection sensor and, thereafter, determining within an amount of time that the computing device is disposed on the body of the user based at least in part on data received from the on-body detection sensor.

Example 49 includes the subject matter of example 48, where the amount of time comprises 30 seconds.

Example 50 includes the subject matter of example 36, where the in-container detection sensor comprises a proximity, light, or orientation sensor.

Example 51 includes the subject matter of example example 36, the on-body detection sensor comprising an orientation, motion, or acceleration sensor.

Example 52 includes the subject matter of example 36, where the container comprises a pocket, purse, or bag.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. An apparatus for maintaining a user authentication status comprising:
    a processor circuit; and
    memory comprising instruction that when executed by the processor circuit cause the processor circuit to:
        determine whether a trusted device has received user input, from a user, within a screen-lock-timeout time of the apparatus;
        determine whether the apparatus is in an on-body state within a timespan based at least in part on data received from an on-body detection sensor;
        authenticate the user to the apparatus;
        transition a display of the apparatus from a locked state to an unlocked state based on authentication of the user to the apparatus; and
        maintain the unlocked state of the display of the apparatus for a length of time greater than the screen-lock-timeout time based on a determination that the trusted device has received user input within the screen-lock-timeout time of the apparatus and a determination that the apparatus is in the on-body state within the timespan.

2. The apparatus of claim 1, comprising a network interface, the network interface comprising a direct network link between the apparatus and the trusted device or an indirect network link comprising a network device.

3. The apparatus of claim 1, the memory comprising instructions that when executed by the processor circuit cause the processor circuit to determine that the apparatus is not in the on-body state based at least in part on data received from the on-body detection sensor and, thereafter, to transition the display of the apparatus from the unlocked state to the locked state.

4. The apparatus of claim 1, the memory comprising instructions that when executed by the processor circuit cause the processor circuit to develop the screen-lock-timeout time or the timespan with machine learning.

5. The apparatus of claim 1, the memory comprising instructions that when executed by the processor circuit cause the processor circuit to determine whether the apparatus is disposed within a container based at least in part on data received from an in-container detection sensor and distinguish the apparatus being disposed within the container from the apparatus being disposed face-down on a surface.

6. The apparatus of claim 1, the memory comprising instructions that when executed by the processor circuit cause the processor circuit to determine that the apparatus and trusted device are within a distance of each other and to transition the display of the apparatus or trusted device from a locked state to an unlocked state.

7. The apparatus of claim 6, the distance comprising a first distance in a trusted environment and a second distance shorter than the first distance in an untrusted environment.

8. The apparatus of claim 1, the memory comprising instructions that when executed by the processor circuit cause the processor circuit to transition the display of the apparatus from the unlocked state to the locked state if a distance between the apparatus and the trusted device exceeds a threshold, if an acceleration of the apparatus exceeds a threshold, or if a network connection between the apparatus and the trusted device is lost.

9. A computer-implemented method for maintaining a user authentication status comprising:
    authenticating a user to a computing device;
    transitioning a display of the computing device from a locked state to an unlocked state based on authentication of the user to the computing device;

determining that a trusted device in electronic communication with the computing device has received input from the user within a screen-lock-timeout time of the computing device;

determining that the computing device is in an on-body state within a timespan based at least in part on data received from an on-body detection sensor; and maintaining the unlocked state of the display of the computing device for a length of time greater than the screen-lock-timeout time based on the trusted device receiving input from the user within the screen-lock-timeout time of the computing device and the computing device being in the on-body state within the timespan.

10. The computer-implemented method of claim 9, further comprising communicating between the computing device and trusted device using a network interface comprising a direct network link between the computing device and the trusted device or an indirect network link comprising a network device.

11. The computer-implemented method of claim 9, further comprising determining that the computing device is not in the on-body state based at least in part on data received from the on-body detection sensor and, thereafter, transitioning the display of the computing device from the unlocked state to the locked state.

12. The computer-implemented method of claim 9, comprising developing the screen-lock-timeout time or the timespan with machine learning.

13. The computer-implemented method of claim 9, further comprising distinguishing the on-body state from the computing device being disposed face-down on a surface.

14. The computer-implemented method of claim 9, further comprising determining that the computing device and trusted device are within a distance of each other and transitioning the display of the computing device or trusted device from a locked state to an unlocked state.

15. The computer-implemented method of claim 14, the distance comprising a first distance in a trusted environment and a second distance shorter than the first distance in an untrusted environment.

16. The computer-implemented method of claim 9, further comprising transitioning the display of the computing device from the unlocked state to the locked state if a distance between the computing device and the trusted device exceeds a threshold, if an acceleration of the computing device exceeds a threshold, or if a network connection between the computing device and the trusted device is lost.

17. A non-transitory machine-readable storage medium comprising instructions that, when executed by a processing device, cause the processing device to:

authenticate a user to a computing device;

transition a display of the computing device from a locked state to an unlocked state based on authentication of the user to the computing device;

determine that a trusted device has received input from the user within a screen-lock-timeout time of the computing device;

determine that the computing device is in an on-body state within a timespan based at least in part on data received from an on-body detection sensor; and maintain the unlocked state of the display of the computing device for a length of time greater than the screen-lock-timeout time based on the trusted device receiving input from the user within the screen-lock-timeout time of the computing device and the computing device being in the on-body state within the timespan.

18. The non-transitory machine-readable storage medium of claim 17, the instructions further comprising communicating between the computing device and trusted device using a network interface comprising a direct network link between the computing device and the trusted device or an indirect network link comprising a network device.

19. The non-transitory machine-readable storage medium of claim 17, the instructions further causing the processing device to determine that the computing device is not in the on-body state based at least in part on data received from the on-body detection sensor and, thereafter, transition the display of the computing device from the unlocked state to the locked state.

20. The non-transitory machine-readable storage medium of claim 17, the instructions further causing the processing device to develop the screen-lock-timeout time or the timespan with machine learning.

21. The non-transitory machine-readable storage medium of claim 17, the instructions further causing the processing device to distinguish the on-body state from the computing device being disposed face-down on a surface.

22. The non-transitory machine-readable storage medium of claim 17, the instructions further causing the processing device to determine that the computing device and trusted device are within a distance of each other and transition the display of the computing device or trusted device from a locked state to an unlocked state.

23. The non-transitory machine-readable storage medium of claim 22, the distance comprising a first distance in a trusted environment and a second distance shorter than the first distance in an untrusted environment.

24. The non-transitory machine-readable storage medium of claim 17, the instructions further causing the processing device to transition the display of the computing device from the unlocked state to the locked state if a distance between the computing device and the trusted device exceeds a threshold, if an acceleration of the computing device exceeds a threshold, or if a network connection between the computing device and the trusted device is lost.

25. The non-transitory machine-readable storage medium of claim 17, the instructions further causing the processing device to maintain the unlocked state of the display further comprising software instructions to collect data for an amount of time before re-determining that the trusted device has received input from the user within the screen-lock-timeout time of the computing device.

* * * * *